3,354,098
ELASTOMERIC SILAZANE POLYMERS AND
PROCESS FOR PREPARING THE SAME
James D. Byrd, Huntsville, Ala., assignor to the United
States of America as represented by the Administrator
of the National Aeronautics and Space Administration
No Drawing. Filed May 31, 1966, Ser. No. 554,949
6 Claims. (Cl. 260—2)

The invention described herein was made by an employee of the United States Government and may be manufactured or used by or for the Government for governmental purposes without the payment of any royalties thereon or therefor.

This invention relates to organosilicon polymers and more particularly to elastomeric silazane polymers and to a process for preparing the same.

Polymeric silazanes, that is, polymers containing silicon-nitrogen linkages, exhibit outstanding properties for materials applications in the aerospace field where conventional polymers often undergo failure because of the extremes of temperature, pressure and radiation encountered. The Si—NH linkage of silazane polymers is isoteric to the Si—O linkage of the more familiar and widely used silicone polymers, and this linkage provides the basis for a group of polymers similar to silicones, but with better resistance to extreme temperatures. Silazanes offers the advantage of being able to react or crosslink at the hydrogen atom which is attached to the nitrogen atom. Another theoretical advantage of the silazanes is the $d\pi$—$p\pi$ interaction between the silicon and nitrogen atoms inhering from the ability of unshared pairs of electrons of the nitrogen atom to interact with the empty $d$ orbitals of the silicon. This interaction results in a shorter bond distance, and the Si—N bond is rendered more stable and less subject to nucleophilic attack in many cases.

One class of silazane polymers which have been studied extensively is represented by the formula:

(1) 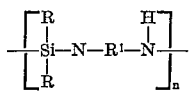

where R is a monovalent hydrocarbon radical and $R^1$ is a divalent hydrocarbon radical. Diamine silazane polymers of this type are normally prepared by reacting a diamine such as ethylene diamine with a diorganosilane such as dimethyldichlorosilane. The polymeric reaction product of the diamine and the diorganosilane has also been obtained in cyclic and ladder forms, as represented by the formulas:

(2) 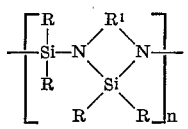

(3) 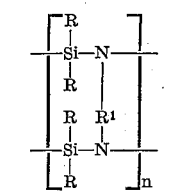

where R and $R^1$ are as previously defined.

Rochow in U.S. Patent No. 3,098,830 discloses the preparation of ladder-type polymers as depicted in Formula 3 by reacting the polymer of Formula 1 with certain metal chlorides. In a later report, however, Kruger and Rochow ["Polyorganosilazanes," Journal of Polymer Science, Part A, 2, 3179, (1964)] indicate that the resulting polymers also contain five-membered ring systems as shown by Formula 2. Other workers have likewise reported the isolation of silazane polymers having the cyclic configuration of Formula 2. In all cases, it was necessary to perform a two- or three-step reaction to obtain a product having an analysis which suggested the ladder or cyclic structure.

None of the diamine silazane polymers prepared by previous workers have exhibited elastomeric properties. The cross-linked polymer produced in the Rochow patent was in the form of a hard, brittle mass when cured, the product being useful as an inflexible insulator material for electrical conductors. The polymers obtained by other workers have been viscous liquids or sticky solids with a low molecular weight and no apparent utility. Elastomeric diamine silazane polymers are desired in order to take advantage of the favorable thermal stability of these polymers in applications requiring material with elastomeric properties, for example, for high-temperature seals and gaskets.

In addition to providing elastomeric properties in these polymers, a need exists for a simpler, improved process for their preparation. The methods previously employed have required at least two reaction steps, and yields have been relatively low. A simple, one-step process would provide substantial advantages and allow economical large-scale production.

It is therefore an object of this invention to provide diamine silazane polymers having elastomeric properties.

Another object is to provide a one-step reaction process for preparing elastomeric diamine silazane polymers.

Still another object is to provide a process for preparing diamine silazane polymers having a high molecular weight.

Other objects and advantages of the invention will be apparent from the following description.

In the present invention elastomeric diamine silazane polymers are prepared by reacting a bifunctional amine with a diorganodihalogenosilane in the presence of an acid acceptor. An elastomeric polymer is readily obtained at a high yield in a one-step reaction process by this means.

Although this invention is not to be understood as limited to a particular theory, it is postulated that the elastomeric character of the product polymers results primarily from the formation of a relatively high proportion of ladder- and/or cyclic-type structures as depicted in Formulas 2 and 3, above. The acid acceptor promotes the formation of these structures by reacting with and effectively removing the acid hydrohalide by-product formed in the polymerization reaction. The acid would otherwise interfere with the desired reaction and tend to terminate polymerization. The higher molecular weight obtained in the present process is another factor which contributes to the elastomeric character of the product.

The diorganodihalogenosilane reagent in the present process is represented by the formula:

(4) 

where X is a halogen and R is a monovalent hydrocarbon radical. The monovalent hydrocarbon radical can be an alkyl radical such as methyl, ethyl, propyl, butyl and the like; an aryl radical exemplified by phenyl, naphthyl, xylyl and tolyl; an aralkyl radical such as benzyl and phenylethyl; an alkenyl radical such as vinyl and allyl; a cycloalkyl radical such as cyclohexyl and cycloheptyl; or a cycloalkenyl radical such as cyclohexenyl. Chlorine is the preferred halogen component, although any other halogen can be used. Dimethyldichlorosilane is a particularly preferred reagent. Examples of other specific reagents within the scope of Formula 4 are diethyldichlorosilane, diphenyldichlorosilane and vinylphenyldichlorosilane.

The bifunctional amine is represented by the formula:

(5)     $H_2NR^1NH_2$ where $R^1$ is a divalent hydrocarbon radical. Examples of suitable radicals are alkylene radicals such as ethylene, trimethylene, isobutylene and hexamethylene; cycloalkylene radicals such as cyclohexylene and cycloheptylene; and arylene radicals such as m-phenylene, p-phenylene, p,p'-diphenylene and tolylene. Ethylenediamine is the preferred amine reagent, and other examples of specific amines are 1,3 propanediamine, 1,6 hexanediamine, 1,4 phenylenediamine, piperazine, benzidine, 4,4' methylenedianiline, and 4,4' oxydianiline.

The acid acceptor can be any base which preferentially reacts with and removes the by-product hydrohalide so that the hydrohalide does not react with the diamine undergoing polymerization. Any tertiary amine can be used as the acid acceptor, and triethylamine and pyridine are preferred. Weak inorganic bases such as alkali metal carbonates and bicarbonates can also be used.

The bifunctional amine and the diorganodihalogenosilane are preferrably reacted at the stoichiometric requirement for the cyclic and ladder structures, that is, 2 moles silane per mole diamine. However, a wide range of silane-to-diamine mole ratios from about 2:1 to 1:1 can be used. Higher proportions of the amine promote the formation of larger amounts of linear-type polymers of Formula 1 above, so that the elastomeric character of the product is decreased. The acid acceptor is provided at a proportion of at least two moles per mole of silane reactant so as to react with all of the liberated hydrohalide, two moles of hydrohalide being released per mole of silane.

The elastomeric diamine silazane polymers of the present invention are prepared by heating the reactants and the acid acceptor together at the proportions given above in a suitable solvent. Any solvent which dissolves the reactants and the product, but not the hydrohalide by-product, and which is inert to the reaction can be used. Examples of suitable solvents are benzene, xylene and toluene. In order to avoid an uncontrolled temperature rise due to the exothermic nature of the polymerization reaction, the reactants should be mixed slowly. In a preferred procedure the silane is dissolved in one portion of the solvent and the amine and acid acceptor are dissolved in another portion, and the resulting solutions are mixed by slowly adding one to the other. The mixture is then heated under reflux conditions to complete polymerization. In general a reflux period from 30 minutes to 24 hours can be used, and at least 2 or 3 hours is preferred. The product polymer will generally contain at least 50 to 100 repeating units of the segment structures shown in Formulas 2 and 3. The exact proportion of each of these structures is not known, but the elastomeric character of the product suggests the presence of a substantial proportion of ladder-type bridges as cross-linking between chains.

The by-product hydrohalide salt is formed as a solid precipitate in the reaction medium, and the precipitate can be removed easily by filtration. The product polymer is then recovered by removing the bulk of the solvent by means of evaporation or distillation. If desired, a portion of the solvent can be retained with the polymer to facilitate subsequent processing.

The raw polymer is in the form of a spongy yellow mass. Useful forms of the polymer, for example, thin film or sheet, can be obtained by conventional milling and compounding.

The following examples are illustrative of the practice of this invention:

Example I

A 0.2 mole portion of dimethyldichlorosilane and 200 milliliters of dry benzene were added to a one-liter, three-neck flask equipped with a stirrer, dropping funnel and reflux condenser. A separate solution was prepared containing 0.2 mole ethylenediamine and 0.4 mole triethylamine in 100 milliliters of dry benzene. The mixed amine solution was added dropwise to the chlorosilane over a ninety minute period. The resulting solution was then refluxed for a period of three and one-half hours. Triethylamine hydrochloride, which formed as a solid precipitate in the mixture, was removed by filtration and the benzene solvent was removed by evaporation at reduced pressure. A spongy yellow polymeric product was obtained at a yield of 97%.

The extent of formation of cyclic- and ladder-type structures, as opposed to the linear type, was determined by analyzing for silicon and nitrogen content. (The carbon and hydrogen content of the three types are so close as to be valueless for characterization purposes.) The calculated values for each type, as defined in Formulas 1, 2 and 3, above, and the experimental values are given below:

NITROGEN AND SILICON CONTENT OF POLYMERS

| | Linear Structure | Cyclic Structure | Ladder Structure | Experimental Values |
|---|---|---|---|---|
| Wt. percent Nitrogen | 24.10 | 16.25 | 16.25 | 16.8 |
| Wt. percent Silicon | 24.16 | 32.59 | 32.59 | 31.5 |

It may be seen from the above that the product polymer contained a high proportion of ladder and cyclic structures and very little of the linear type.

In order to compare this polymer to a polymer made from the same reactants in the absence of an acid acceptor, the experiment described above was repeated, except that no triethylamine was used, and the amount of ethylenediamine was 0.6 mole. The product was a viscous light-yellow liquid. Elemental analysis of the product indicated 16.8% nitrogen and 26.2% silicon. Based on the silicon analysis, the structure of the product was about 75% linear and 25% cyclic and/or ladder.

Example II

A silazane polymer was prepared by the procedure of Example I wherein triethylamine was used. After the by-product hydrochloride precipitate was removed, the solvent was evaporated to give a spongy material containing 67% solids. This material was cast on an aluminum plate to form a thin film. The solvent was removed by heating at 70° C. for 18 hours, and the film was cured by heating at 204° C. for 2 hours and at 315° C. for 1 hour. The cured film was a very elastic material which could be peeled from the plate. The film remained unchanged in elasticity and physical appearance after being left standing for 17 months under normal atmospheric conditions.

Example III

Elastomeric polymers were prepared from different diamines and silanes by using the procedure of Example II. 1,3 propanediamine and 1,6 hexanediamine were each reacted with diphenyldichlorosilane. 1,6 hexane diamine was reacted with dimethyldichlorosilane. Triethylamine was used as the acid acceptor in each case. Elastomeric material having a high proportion of cyclic- and/or ladder-type structural units, as indicated by elemental analysis, was obtained in each case.

The above examples are merely illustrative and are not to be understood as limiting the scope of the invention, which is limited only as indicated by the appended claims. It will be apparent to those skilled in the art that in addition to the conditions and ingredients employed above, other conditions and ingredients can be used without departing from the scope of the invention. For example, the product polymer can be combined with various plasticizers, fillers or modifiers.

What is claimed and desired to be secured by United States Letters Patent is:

1. The process for preparing an elastomeric silazane polymer which comprises combining a diorganodihalogenosilane having the formula

where X is a halogen atom and R is a monovalent hydrocarbon radical with a bifunctional amine having the formula

where R' is a divalent hydrocarbon radical and an acid acceptor selected from the group consisting of tertiary amines, alkali metal carbonates and alkali metal bicarbonates in an inert organic solvent, the molar ratio of said silane to said amine being from about 2:1 to 1:1 and the molar ratio of said acid acceptor to said silane being at least about 2:1, heating the resulting mixture under reflux conditions for at least 30 minutes, separating the resulting by-product acid hydrohalide salt from the resulting polymer and recovering said polymer.

2. The process of claim 1 wherein R is a monovalent hydrocarbon radical in the group consisting of alkyl, aryl, aralkyl, alkenyl, cycloalkyl and cycloalkyenyl radicals and R' is a divalent hydrocarbon radical in the group consisting of alkylene, cycloalkylene and arylene radicals.

3. The process of claim 2 where said acid acceptor is triethylamine.

4. The process of claim 3 where R is methyl.

5. The process of claim 4 where $R^1$ is ethylene.

6. The process of claim 5 where X is chlorine.

References Cited

UNITED STATES PATENTS

| | | | |
|---|---|---|---|
| 3,036,019 | 5/1962 | Molotsky et al. | 260—2 |
| 3,098,830 | 7/1963 | Rochow | 260—2 |
| 3,159,668 | 12/1964 | Rochow | 260—2 |
| 3,207,707 | 9/1965 | Klebe | 260—448.2 |

FOREIGN PATENTS

| | | |
|---|---|---|
| 949,896 | 2/1964 | Great Britain. |
| 157,107 | 7/1963 | U.S.S.R. |

OTHER REFERENCES

Noller, Chemistry of Organic Compounds, 2nd ed. 1957, W. B. Saunders Co., pp. 235 and 236. Scientific Library QD 253 N65.

DONALD E. CZAJA, *Primary Examiner.*

L. J. BERCOVITZ, *Examiner.*

M. I. MARQUIS, *Assistant Examiner.*